United States Patent
Davenport

[19]

[11] Patent Number: 5,967,719
[45] Date of Patent: Oct. 19, 1999

[54] SIDEWALL RAIL FOR A TRUCK BED

[76] Inventor: Bobby Davenport, 5003 Market Pl., Mt. Juliet, Tenn. 37122

[21] Appl. No.: 08/905,527

[22] Filed: Aug. 4, 1997

Related U.S. Application Data

[63] Continuation-in-part of application No. 08/652,382, May 23, 1996, Pat. No. 5,827,024.

[51] Int. Cl.[6] ...................................................... B60P 7/08
[52] U.S. Cl. ........................... 410/106; 410/101; 410/110
[58] Field of Search .................................... 410/101, 106, 410/110, 108, 115, 116; 296/3, 41, 43; 248/499; 105/390

[56] References Cited

U.S. PATENT DOCUMENTS

| | | | |
|---|---|---|---|
| 4,604,013 | 8/1986 | Elwell et al. | 410/106 |
| 4,650,382 | 3/1987 | Johnson | 410/110 |
| 4,818,006 | 4/1989 | Arndt | 410/110 X |
| 4,936,724 | 6/1990 | Dutton | 410/110 |
| 4,954,031 | 9/1990 | Geeck, III | 410/110 |
| 5,618,140 | 4/1997 | Okland | 410/106 |
| 5,642,971 | 7/1997 | Ragsdale | 410/106 |
| 5,738,471 | 4/1998 | Zentner et al. | 410/110 |
| 5,827,024 | 10/1998 | Davenport | 410/110 |

*Primary Examiner*—Stephen T. Gordon
*Attorney, Agent, or Firm*—Rick R. Wascher

[57] ABSTRACT

A tie-down rail for a truck bed including spaced apart sidewalls each having a top ledge. The rail comprises a tubular body having a linear portion, an intermediate portion extending from the linear portion, and an angular portion extending from the intermediate portion to form an angle with a longitudinal axis parallel with the linear portion. The linear portion, intermediate portion and angular portion have substantially identical cross-sectional profile. The rail is preferably illuminatable and includes at least one light source to light the interior of the rail. The lighting source preferably includes an illumatable wiring harness having a platform, a bulb receiving portion, and an electrical wire receiving portion. The platform is configured to maintain the wiring harness in an installed position with respect to the rail.

18 Claims, 13 Drawing Sheets

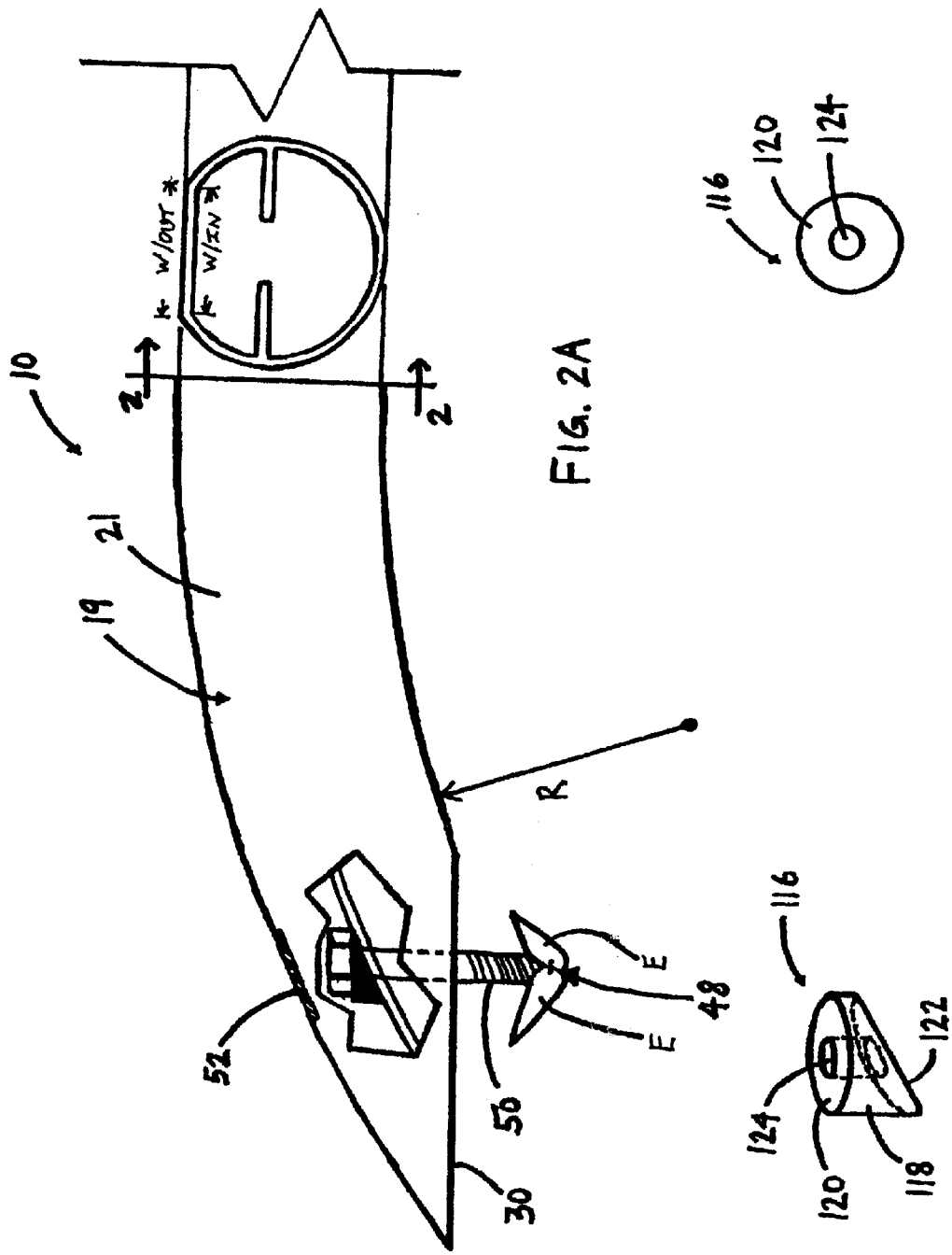

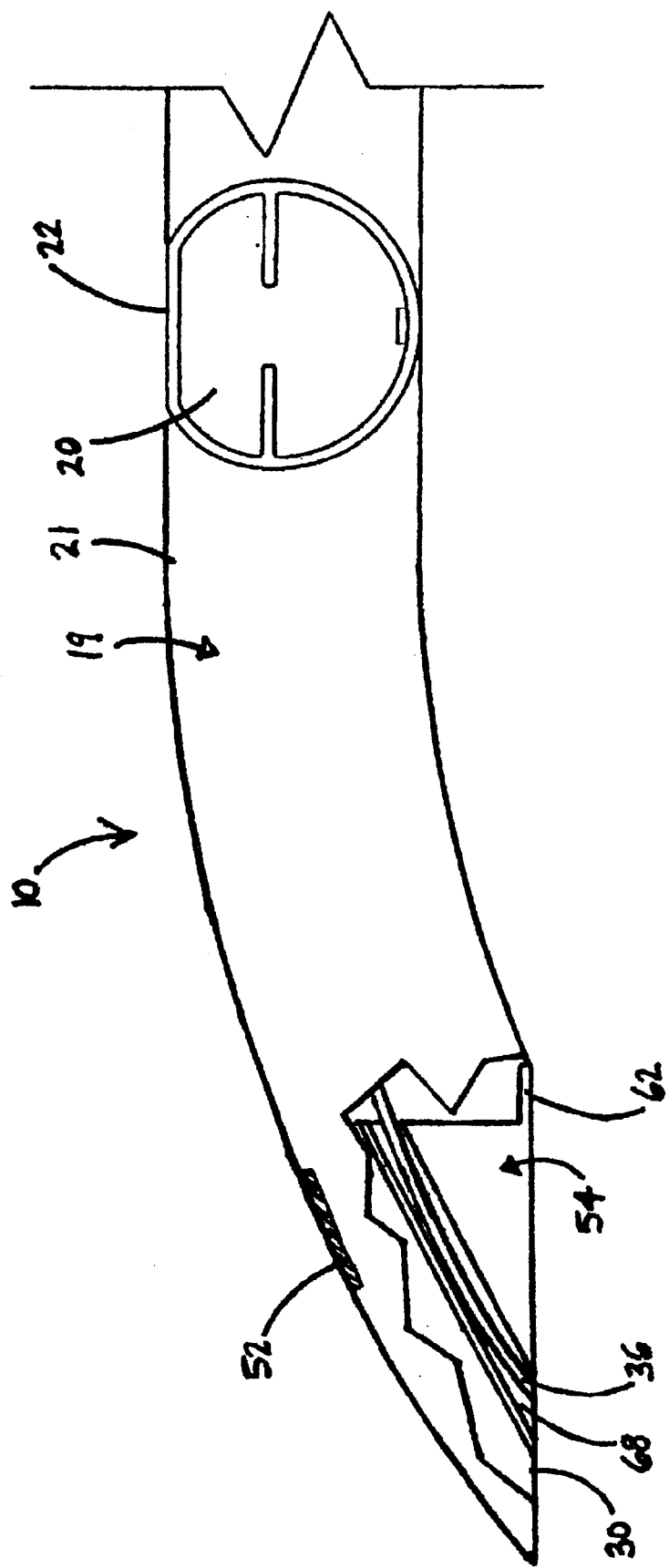

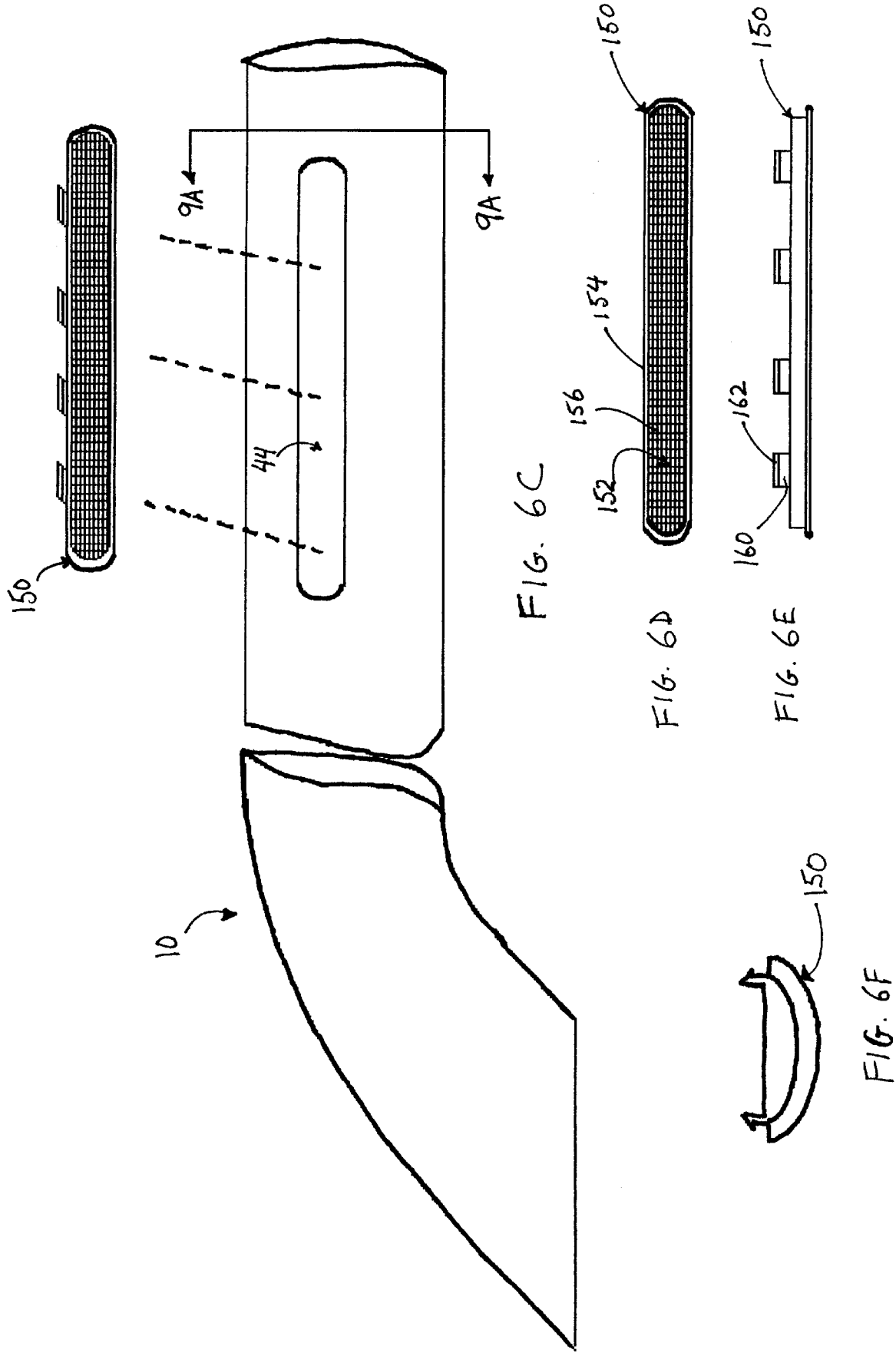

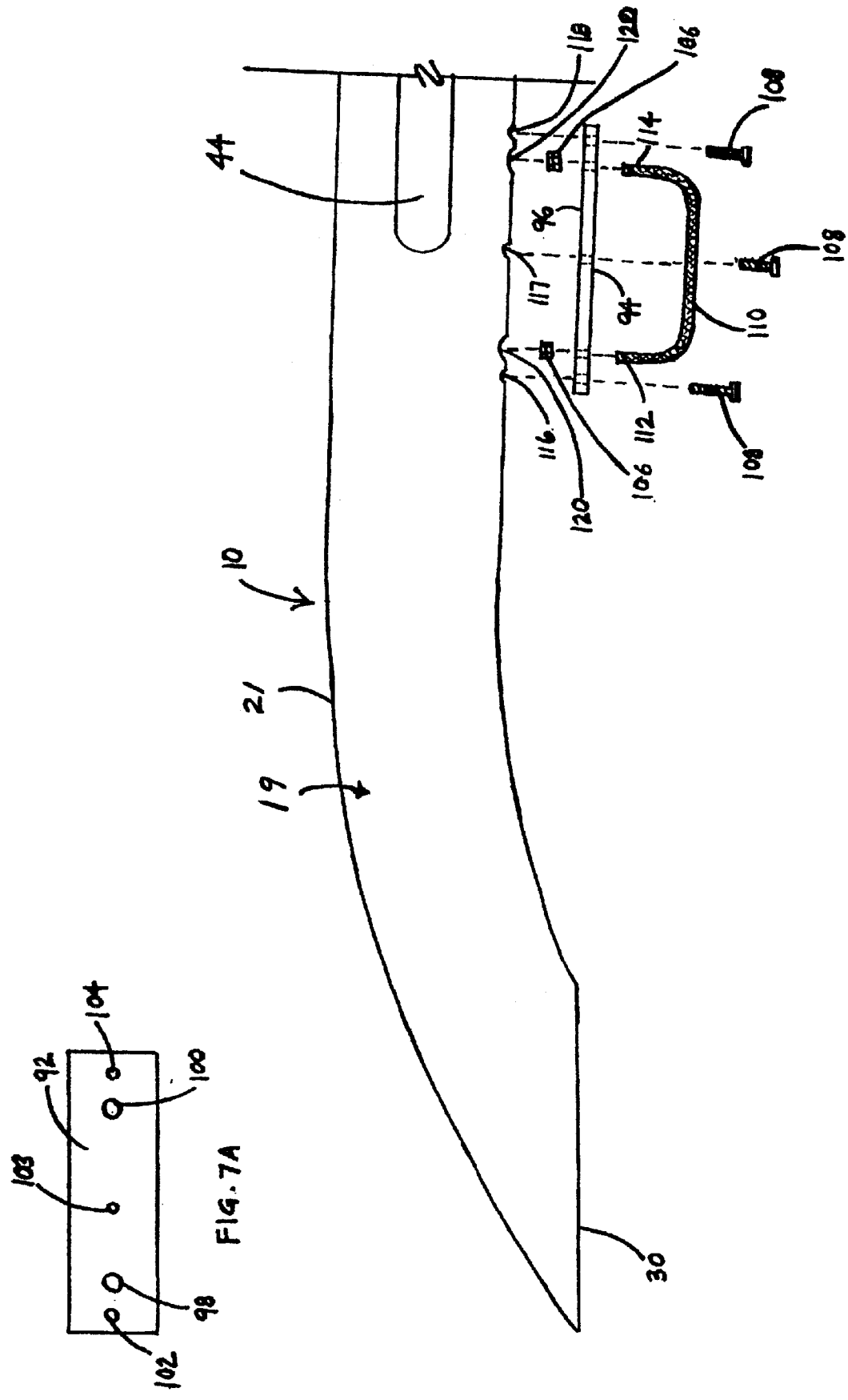

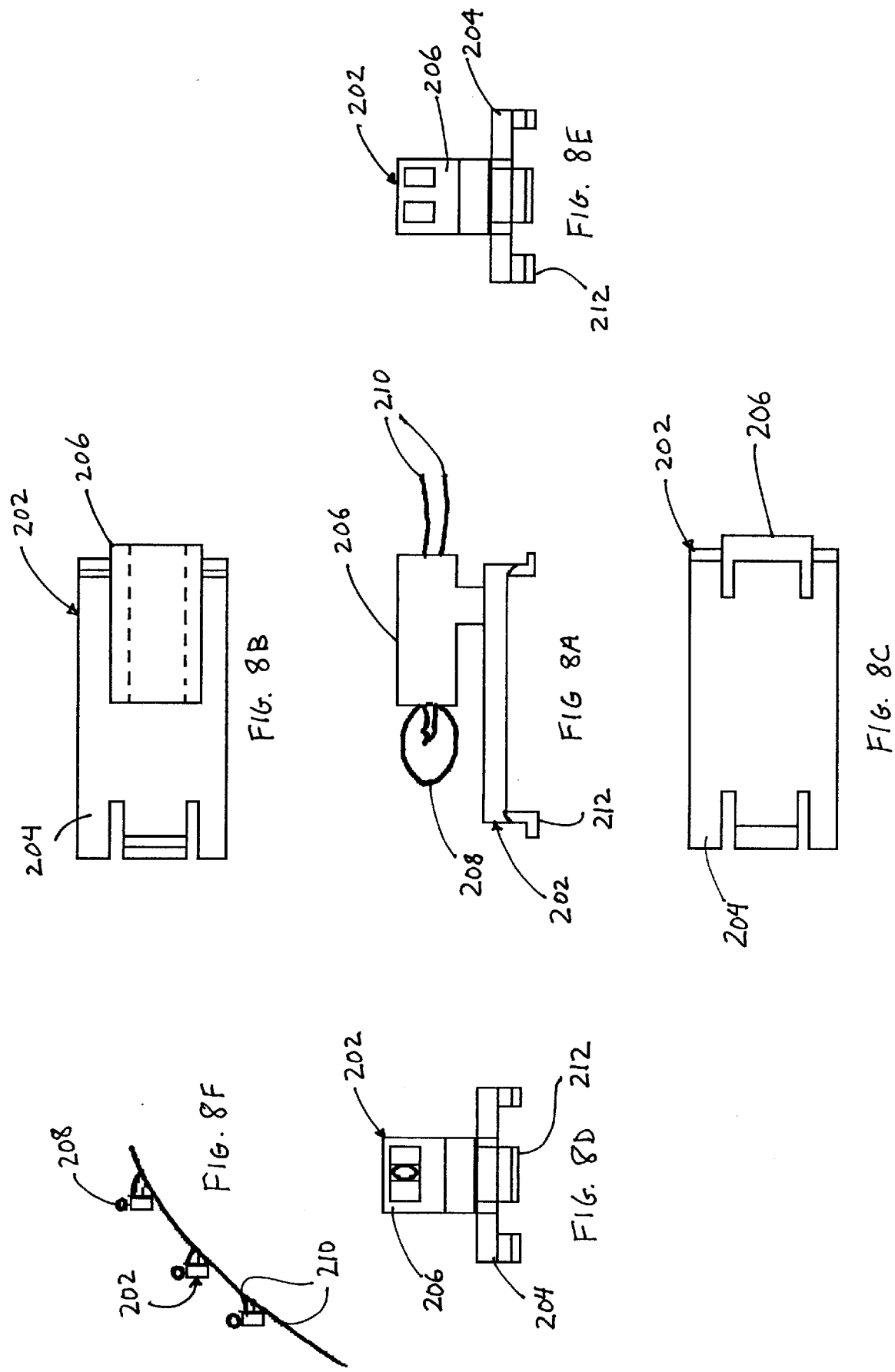

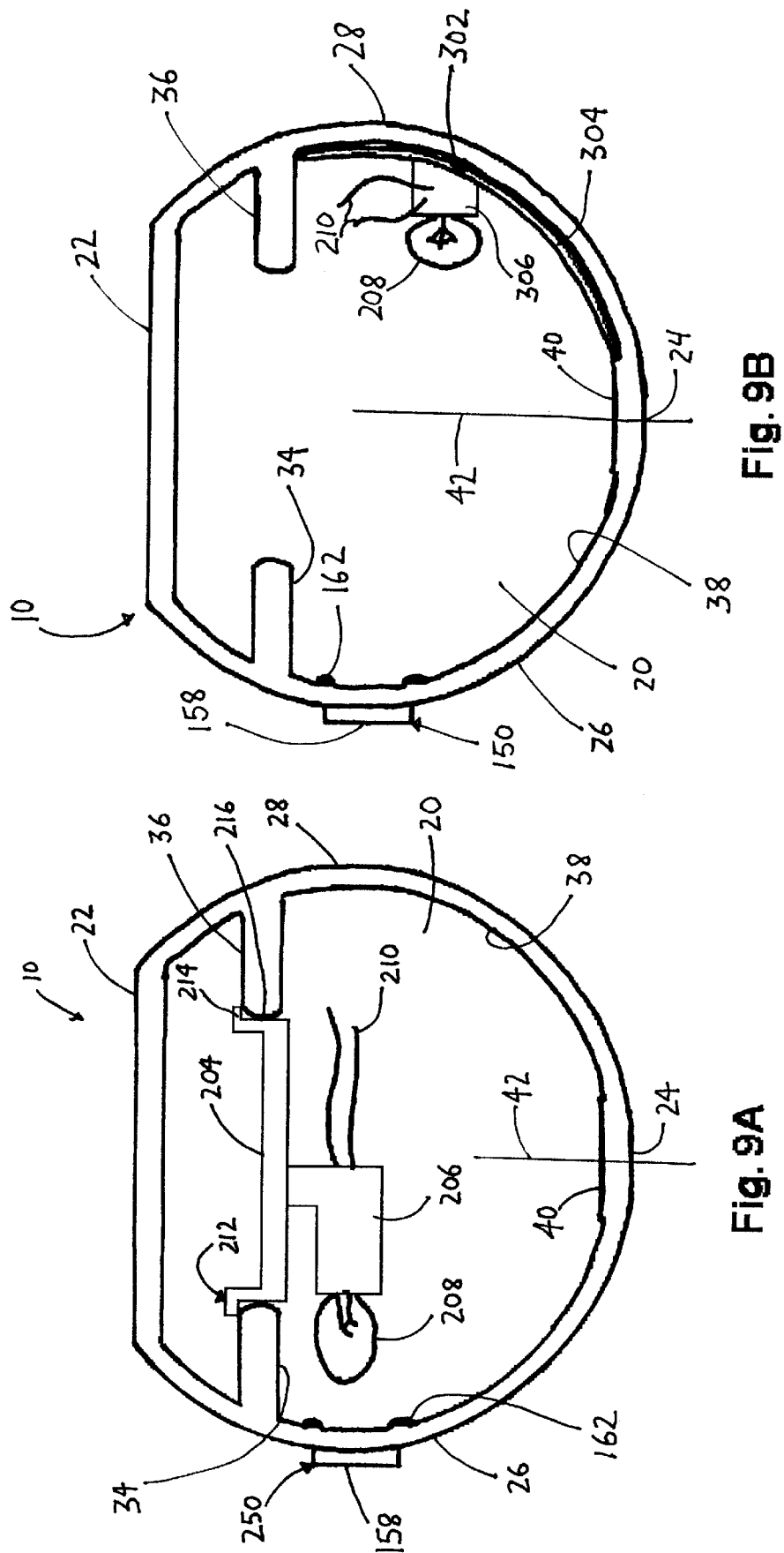

SIDEWALL RAIL FOR A TRUCK BED

This application is a continuation-in-part of application Ser. No. 652,382, filed May 23, 1996, which is now U.S. Pat. No. 5,827,024 granted on Oct. 27, 1998.

BACKGROUND OF THE INVENTION

1. Field of the Invention.

The present invention relates generally to tie-down rails for the sidewall of a truck bed, and more particularly to illuminatable tubular tie-down rails having safety marking capabilities.

2. Description of the Related Art.

Trucks are commonly equipped with various tie-down devices for securing items being transported in the bed of the truck. One form of tie-down device includes a hook mounted in each corner of the bed of the truck to which ropes, elastic cords, cable or other types of tie-down straps (hereinafter collectively referred to as "tie-downs cords") may be attached to secure the items within the bed of the truck. Alternatively, some truck beds include holes extending through the top ledge of the sidewall of the truck bed for receiving posts which are useful for increasing the effective height of the sidewalls. Rope, netting or panels may be attached to the posts to form vertical extensions of the sidewalls of the truck bed for retaining the load.

Yet another form of tie-down device includes tie-down rails, which are mounted along the top ledges of the sidewalls of the bed of the truck. Tie-down rails typically extend the length of the truck bed and provide a structure or frame to which tie-down cords may be attached. Accordingly, tie-down cords may be extended from side-to-side across the top of the truck bed and tied or attached to the tie-down rail to secure the load.

One drawback associated with many of the commercially available tie-down rails is that they are primarily decorative in nature; thus, they are not designed to withstand the tensile forces to which they are subjected when tie-down cords are stretched tautly across the bed of the truck.

Another drawback associated with many of the commercially available tie-down rails is that they do not include means for retaining the tie-down cords at desired positions along the length of the rail. For example, unless the tie-down rail includes a plurality of spaced apart stanchions or some other retaining means intermediate the ends of the rail, the tie-down cords that are wrapped around or attached to the rail have a tendency to creep along the length of the rail during transport, often causing the load to shift or to become unsecured.

Yet another drawback associated with many tie-down rails is that they are not adaptable to different models of trucks having different configurations. The rail typically includes a plate extending laterally from each end and configured to rest flush against the top ledge of the sidewall of the truckbed. The plate includes a plurality of bores through which fasteners are received to attach the rail to the sidewall. The ledges of the sidewalls of many models of trucks include stake pockets or openings for attaching tie-down rails. However, the length of the ledge or the spacing between the stake pockets or "standard holes" varies among manufacturers. The standard holes are the apertures formed in the sidewall of the truck bed on the top ledge and extend through to top ledge to be used as receptacles for ropes and other tie down articles, or even posts associated with campers that mount to the back of pickup truck. The standard holes are positioned at various locations along the sidewall of the vehicle usually by the manufacturer. The number of such holes may vary depending upon the make of vehicle. For instance, the number and location of the standard holes is known to differ between comparably sized trucks of differing make. Thus, many variations of commercially available tie-down rails must be manufactured in a variety of lengths and configurations in order to accommodate the different manufacturers or models of trucks having different standard holes.

U.S. Pat. No. 4,650,382, granted to Johnson and incorporated by reference as if fully set forth herein, is directed to an elongated unitary tie-down rail for a truck bed comprising a bottom flange and an upright flange formed at an acute angle. The top portion of the upright flange terminates in an enlarged elongated rod portion, and a plurality of longitudinally spaced slots are formed in the upright flange immediately below the rod portion to receive tie-down members for securing a load within the truck bed.

U.S. Pat. No. 5,259,711, granted to Beck and incorporated by reference as if fully set forth herein, is directed to a tie-down apparatus having a composite overlying double track on which a car is slidably carried on the topmost track and securement fasteners carried in the lowermost track secure the double track to a supporting rail or truck bed.

U.S. Pat. No. 4,954,031, granted to Geeck, III and incorporated by reference as if fully set forth herein, is directed to a tie rail device composed of a linear body, one flat portion of which can be fastened to the top of the truckbed sidewall of a pickup truck or to the top of its tail gate or to the top of the gunwales of a boat. Another portion of the device extends outwardly from the vehicle and serves as point(s) of attachment for the straps or cords.

U.S. Pat. No. 4,936,724, granted to Dutton and incorporated by reference as if fully set forth herein, is directed to a truck box top molding comprising slotted tails having outwardly extending flange resting on the top of the truck box. The rails are fastened to the box by screws extending through holes in the rails and outwardly into the inside wall of the truck box at the sides and ends. There are longitudinally spaced slots in the rail above the flange.

U.S. Pat. No. 5,228,736, granted to Dutton and incorporated by reference as if fully set forth herein, is directed to a truck box top molding comprising rails having an outwardly extending base resting on the top of the truck box. The rails are fastened to the box by screws extending through holes in the rails and outwardly into the inside wall of the truck box at the sides and ends. An upstanding, longitudinally-extending flange in an internal cavity in each of the side rails receives the hooked outer end of longitudinally movable anchors having clamping screws with knurled knobs thereon to clamp the anchors to the rails in any of an infinite number of possible positions longitudinally of the rails.

U.S. Pat. No. 4,547,014, granted to Wicker and incorporated by reference as if fully set forth herein, is directed to an articulated rigid cover assembly for truck beds comprising a flexible waterproof canvas cover overlying a plurality of elongated metal panels hingedly joined to form a cover assembly. The cover assembly is foldably mounted between a pair of guide tracks which are attached to the upper surface of the side walls of the truck bed. The tracks are attached to the side walls by bolts which are concealed from the exterior of the closed truck bed.

U.S. Pat. No. 4,604,013, granted to Elwell et al. and incorporated by reference as if fully set forth herein, is directed to a vehicle side rail assembly comprising a tread plate adapted to fit over the upper wall of a pickup truck; tubular, open-ended side rail having a portion disposed parallel to and spaced above the tread plate with end portions engaging the tread plate; the bottom wall of the rail split longitudinally to form a slot and having an angular seat formed by shoulders in the bottom wall; a plurality of angular and tubular spacers adapted to fit in a nested manner into the shoulder seat at any location there along and to engage the tread plate; and carriage bolt fasteners slidingly engaged with the rail by the slot and insertable through the spacers, the tread plate and the side panel wall to fasten the assembly to the side panel, the fasteners being hidden from view.

Until now, it is believed that a tubular tie-down rail having a flat top surface, internal structural flanges, safety marking capability, illuminatable capability, the ability to have a universal device attachable to a variety of truck bed standard hole configurations, and attachment means for accommodating a variety of truck bed configurations, has not been invented.

SUMMARY OF THE INVENTION

The preferred embodiment of the present invention includes a pair of elongated tubular rails configured to be secured to the top ledge of the sidewall of a pickup truck and provide illumination to the top ledge making the vehicle safer and more visible at night or in dimly lit areas.

Each rail has a substantially circular cross-section and preferably has a flat or planar top exterior surface with a slightly arched opposing interior surface. The slightly arched interior surface provides enhanced structural stability and rigidity to the rail. Alternatively, the top surface may be slightly arched. The rails are preferably constructed of aluminum; however, they may be constructed of any suitable high strength material such as metals, plastics, composites and the like. Aluminum is preferred because of its light weight.

The rail which is configured for mounting on the ledge of the sidewall of a truck bed, includes a body having spaced apart open ends extending angularly downward along a radius and terminating in ledge-engaging surfaces. In the preferred embodiment, each end extends downward from a central portion of the body forming an obtuse angle therewith. Accordingly, the cross-section at the ends of the rail is greater than the cross-section of the rail intermediate the ends, but has substantially the same appearance if the cutting plane were taken perpendicular to each of the rail body portions (i.e., the linear section L, the intermediate section I, and the angular section A).

The rail includes a plurality of structural ribs or flanges projecting into the interior of the rail from an inner surface of the rail. In the preferred embodiment, a pair of opposing flanges extend a distance from inner side surfaces of the rail in a plane generally parallel to a tangent line drawn across the top surface of the rail. The flanges preferably extend longitudinally along the inner surface the entire length of the rail. The preferred embodiment of the rail also includes a rib projecting upwardly from a bottom inner surface of the rail. Similar to the flanges, the rib preferably extends longitudinally along the entire length of the rail. The flanges and ribs provide structural stability and overall strength which might seem apparent but is certainly unappreciated by rails found in the art to which the invention relates. The present invention uses these structure enhancing features to save weight, costly materials, and provide enhanced structural features to enable the rail to be bent without buckling or denting which prior to the present invention was believed not to be possible.

The preferred embodiment of the rail also includes a plurality of spaced apart longitudinal slots or openings formed in the side surfaces of the rail. A cover, such as an extrusion constructed of vinyl, plastic, rubber or some other suitable material, may be slidably received within the rail and positioned along the surface adjacent the slots such that the cover is visible from the outside of the rail at the slots. The cover may comprise one continuous profile configured to seat along the inner surface of the rail between the flanges, or it may be formed of two pieces, each piece being configured to extend longitudinally along the inner surface of the rail between one of the flanges and the rib extending along the bottom inner surface.

Anchoring means are provided for securing the rail to the ledge of the truck bed. In the preferred embodiment, the anchoring means comprises a bracket having a substantially planar ledge engaging surface and a longitudinal slot formed therein for receiving a fastener. The bracket is configured to be received within the end of the rail and to engage the inner surface of the rail to prevent movement of the plate within the rail. The bracket is inserted into the end of the rail such that the planar, ledge-engaging surface is positioned to rest on the ledge of the sidewall of the truck bed. The fastener extends through a bore formed in the top of the rail to engage the slot and the ledge of the truck bed. The slot enables the user to adjust the fastener to a variety of positions in order to accommodate truck beds of different lengths or configurations.

In the preferred embodiment, the bracket includes a body having channels formed along side surfaces and configured to cooperatively engage the flanges projecting from the inner surface of the rail. The bracket is configured to slide into the end of the rail such that the flanges are received within the channels and the planar ledge-engaging surface is flush with the end of the rail.

In an alternate embodiment, the bracket comprises a body that is inserted into the end of the rail and attached thereto by at least one fastener extending through aligned bores in the rail and the body of the plate. In yet another embodiment, the anchoring means comprises a bracket configured to seat on the flanges extending from the interior surface of the rail. In this embodiment, the bracket comprises a cylindrical body having a planar top surface, an angled bottom surface, and a longitudinal bore extending therethrough. A bolt is inserted into the bore formed in the top of the rail and extends through the bore formed in the bracket to operatively engage the ledge of the truck bed. The bottom surface of the bracket may be knurled or include teeth for biting the surface of the flanges when the bolt is tightened to retain the bracket in the desired position.

The rail also includes a clip assembly or clip means to enable a user to secure a tie-down cord to the rail. The clip assembly preferably comprises a plate having a first side, a second side, and a plurality of spaced apart bores. A loop is formed by a length of spring wire having spaced apart ends extending through spaced apart bores from the first side of the plate to the second side of the plate. The ends of the wire are retained adjacent the second side of the plate by a clamp or other equivalent retaining device. The ends of the wire and the clamp are received within aligned bores formed in the rail enabling the plate may be mounted flush against the rail. Alternatively, the clip means may comprise a plurality of spaced apart eye bolts attached to the rail.

The present invention may, therefore, be summarized in a variety of ways, one of which is the following: a tie-down rail for a truck bed including spaced apart sidewalls, the sidewalls each having a top ledge, the tie-down rail comprising an elongated tubular body having a substantially circular cross-section and a hollow interior, the body further comprising open ends extending angularly downward and adapted to rest on the ledge of the sidewall; anchoring means contained within the ends of the rail for securing the rail to the ledge; and at least one fastener received within a bore formed in the top surface of the rail for operatively engaging the anchoring means, the rail and the top ledge. The tie-down rail further comprises a planar top surface and at least one flange projecting into the interior of the rail from an inner surface and a rib projecting into the interior of the body from a bottom inner surface of the rail along a centerline of the rail. The at least one flange further comprises a pair of oppositely disposed flanges. The flanges are positioned in a plane parallel to the top surface of the rail. The tie-down rail may include a plurality of spaced apart slots formed along at least one side surface of the rail.

The anchoring means comprises a bracket having a top surface, a bottom surface and a bore extending therethrough for receiving a fastener; wherein the bottom surface of the bracket is configured to operatively engage the at least one flange. Alternatively, the anchoring means comprises a bracket having a ledge-engaging surface and a longitudinal slot configured to receive the at least one fastener; the bracket is configured to be received within the end of the rail and to engage the inner surface of the rail; and attachment means for attaching the bracket to the rail.

The attachment means comprises at least one fastener extending through aligned bores formed in the rail and the bracket. Alternatively, the attachment means comprises at least one channel formed in the bracket configured to cooperatively engage the at least one flange along the inner surface of the rail.

The tie-down rail further comprises a cover configured to be received within the rail and positioned along the inner surface of the rail adjacent the plurality of slots such that the cover is viewable through the plurality of slots.

The tie-down rail further comprises at least one clip assembly attached to the rail for securing a tie-down cord to the rail. The clip assembly comprises a plate having a first side, a second side and a plurality of holes formed therein; loop means attached to the plate for receiving the tie-down cord; and at least one fastener for attaching the plate to the rail.

Yet another way of summarizing the present invention is as follows: a tie-down rail for a truck bed having sidewalls, each sidewall having a top ledge, the tie-down rail comprising an elongated tubular body having a substantially circular cross-section, a substantially hollow interior, and spaced apart open ends that extend angularly downward to engage the top ledge of the truck bed; flange means projecting into the interior of the rail from an inner surface; a bracket configured to be received within the end of the rail and to cooperatively engage the inner surface of the rail, the bracket having a planar ledge-engaging surface and a longitudinal slot configured to receive a fastener; wherein the fastener is received within a bore in the rail and extends through the slot to operatively engage the bracket and the ledge; and attachment means for attaching the bracket to the rail. The flange means further comprises a pair of oppositely disposed flanges extending from side surfaces of the rail. The rail further comprises a rib projecting into the interior of the rail from a bottom surface.

The tie-down rail further comprises a plurality of clips for securing a tie-down cord to the rail. Each of the plurality of clips comprises a plate having a first side, a second side, a pair of spaced apart bores for receiving spaced apart ends of a loop, and a plurality of bores configured to receive at least one fastener for attaching the plate to the rail; wherein the ends of the loop extend through the spaced apart bores from the first side of the plate to the second side of the plate; and clamp means for retaining the ends of the loop adjacent the second side of the plate; wherein the ends of the loop and the clamp means are received within at least one opening in the rail when the plate is operably attached to the rail.

A third way of summarizing the present invention is: a tie-down rail for a truck bed including spaced apart sidewalls, the sidewalls each having a top ledge, the tie-down rail comprising a tubular body having a flat top portion, a rounded bottom portion, and spaced apart open ends extending angularly downward such that the ends are capable of resting on the ledge; a pair of flanges projecting into the rail from an inner surface; an anchoring device configured to be received within the end of the rail and to operatively engage the flanges, the anchoring device having a slot formed therein and a planar ledge-engaging surface; a fastener received within a bore formed in the rail and extending through the slot to operatively engage the anchoring device and the ledge; and a plurality of clips for receiving a tie-down cord.

Each of the clips comprises a plate having a first side, a second side, and a plurality of bores formed therein; a length of spring wire having spaced apart ends extending through any of the plurality of bores from the first side to the second side of the plate to form a loop; retaining means for retaining the ends of the wire adjacent the second side of the plate; cooperating bores formed in the rail for receiving the ends of the wire and the retaining means when the plate is operably attached to the rail; and at least one fastener insertable into at least one of the plurality of bores in the plate for attaching the plate to the rail.

The present invention may, therefore, be summarized in a variety of ways, one of which is the following: a tie-down rail for a truck bed including spaced apart sidewalls each having a top ledge, comprising: an elongated tubular body having a substantially linear portion which is parallel to a longitudinal axis, an intermediate portion extending from and merging with the substantially linear portion, and an angular portion having spaced apart ends wherein one of the spaced apart ends merges with and extends from the intermediate portion to form an angle with the longitudinal axis of the linear portion, the linear portion has a first outer cross-sectional profile, the intermediate portion has a second outer cross-sectional profile, and the angular portion has a third outer cross-sectional profile, such that the first outer cross-sectional profile and second outer cross-sectional profile and third outer cross-sectional profile are substantially identical; and the second outer cross-sectional profile includes an external arcuate portion which merges with a planar portion to form a continuous external wall.

The preferred embodiment of the tie-down rail further comprises a juncture between the arcuate portion and the planar portion comprising a pair of spaced apart edges. The pair of spaced apart edges preferably comprise a pair of spaced apart parallel edges.

The preferred embodiment of the tie-down rail may be further summarized and described to have a configuration such that a line drawn tangent to the arcuate portion always forms an angle with a plane parallel with the planar portion.

The preferred embodiment of the tie-down rail further comprises an inside surface of the planar portion and an outside surface of planar region wherein the inside surface is has a greater width than the outside surface portion; and, an interior surface of the arcuate portion having inwardly projecting opposing flanges extending therefrom. The interior surface of the arcuate portion preferably has a reinforcing rib positioned opposite the inside surface of the planar portion.

The body of the tie-down rail is preferably constructed of metal selected from the group of metal materials consisting of steel, aluminum, steel alloys, and aluminum alloys. At least one light transmitting aperture is included in the preferred embodiment of the body; and, a removable or permanent lens is provided to cover the aperture. The preferred embodiment of the lens is removable such that it is configured to frictionally engage the body of the rail during use, and resembles a safety reflector.

A preferred tie down rail also includes a lighting means for illuminating the interior of the body. The lighting means preferably further comprises socket means for receiving at least one illuminatable bulb and illuminating it; and/or a wiring harness having at least one electrical socket configured for receiving an illuminatable bulb, and an illuminatable bulb operably connected to the at least one electrical socket; wherein the wiring harness supplies electrical energy from a source thereof to the at least one socket for illuminating the bulb. The preferred socket means further comprises a wiring harness having a plurality of electrical sockets configured to receive an illuminatable bulb and capable of supplying electrical energy from a source thereof to the plurality of electrical sockets to illuminate the bulb, and is configured for engagement with the interior of the body.

The socket means may be a section of curved spring steel capable of flexing and resiliently springing back to engage the interior of the hollow and secure the wiring harness therein. In addition, the invention may also be summarized to include an illuminatable wiring harness means for illuminating the interior structure of a tie-down rail of a motorized vehicle, the wiring harness comprising: at least one socket having a platform, a bulb receiving portion, and an electrical wire receiving portion; the platform further comprises a top surface, a bottom surface, and at least one flexibly resilient flange extending from the platform wherein the flange is configured to occupy a first rest position and flex through a range of motion to a second position to engage the interior structure of the tie-down rail during use to maintain the wiring harness in an installed position. At least one of the plurality of electrical sockets can therefore be generally described as being configured for engagement with the interior of the body.

The present invention may also be summarized as an illuminatable tie-down rail for a motorized vehicle comprising: a substantially tubular body having a hollow interior portion and a light transmitting wall portion, a light source operably attached to tubular body in such a way as to enable light emanating therefrom to pass from the hollow interior portion of the tubular body through the light transmitting wall portion.

It is an object of the present invention to provide a tubular tie-down rail for attachment to the ledge of the sidewall of a truck bed, the tie-down rail comprising a flat top portion and a rounded bottom portion.

It is an object of the present invention to provide a tubular tie-down rail for attachment to the ledge of the sidewall of a truck bed, the tie-down rail comprising a linear body portion, an intermediate body portion and an angular body portion.

It is an object of the present invention to provide a tubular tie-down rail having a uniform substantially circular cross-section wherein the linear, intermediate and angular portion all have substantially the same cross-section when the cutting plane is positioned substantially perpendicular to the rail body portion being cross-sectioned.

It is an object of the present invention to provide a tubular tie-down rail having at least one flange projecting into the interior of the rail to enhance the structural integrity of the rail.

It is an object of the present invention to provide a tubular tie-down rail having means for adjustably attaching the rail to the ledge of a truck bed, the attachment means comprising a plate configured to be received within the end of the rail and to cooperatively engage the inner surface of the rail.

It is an object of the present invention to provide a tubular tie-down rail having a plurality of clips capable of receiving a tie-down cord.

It is an object of the present invention to provide an illuminatable safety device in the nature of a sidewall rail for a motorized vehicle such as a pickup truck.

It is an object of the present invention to provide an illuminatable safety device in the nature of a sidewall rail for a motorized vehicle such as a pickup truck, wherein the illuminatable component includes a wiring harness of several unique configurations to secure at least one light adjacent the hollow body in order to illuminate it.

It is an object of the present invention to provide a tubular aluminum rail which is lighter in weight than tubular steel rails yet having the strength and resistance to bending comparable to or better than steel rails.

It is a feature of the present invention to provide a substantially tubular rail having a planar top exterior surface portion to provided enhanced structural stability and rigidity to the rail particularly when the rail is made of a lightweight metal material such as aluminum.

These and other objects, features and advantages shall become apparent after consideration of the description and drawings set forth herein. All such objects, features and advantages are contemplated to be within the scope of the present invention even though not specifically set forth.

BRIEF DESCRIPTION OF THE DRAWINGS

FIG. 2A is a partial side elevational view of the embodiment of the invention shown in FIG. 1 with a cutaway portion;

FIG. 2B is a perspective view of an embodiment of the bracket of the present invention;

FIG. 2C is a top view of the embodiment of the bracket shown in FIG. 2B;

FIG. 6A is a partial side elevational view of the present invention with a cutaway portion showing the bracket of FIG. 4A operatively positioned therein;

FIG. 6C is a partially exploded elevational view of an embodiment of the rail of the present invention having a lens cover positioned in line with over an aperture formed therein;

FIG. 6D is a front view of an embodiment of the lens cover of the present invention shown in FIG. 6C;

FIG. 6E is a side view of an embodiment of the lens cover of the present invention shown in FIG. 6C;

FIG. 6F is a front view of an embodiment of the lens cover of the present invention shown in FIG. 6C;

FIG. 7A is a top elevational view of the plate of the clip assembly of the present invention; and FIG. 7B is an partial exploded view of the present invention showing an embodiment of the clip assembly;

FIG. 8A is a side view of an embodiment of the inventive socket or wiring harness component;

FIG. 8B is a top view of the embodiment of the inventive wiring harness socket shown in FIG. 8A;

FIG. 8C is a bottom view of the embodiment of the inventive wiring harness socket shown in FIG. 8A;

FIG. 8D is a left side view of the embodiment of the inventive wiring harness socket shown in FIG. 8A;

FIG. 8E is a right side view of the embodiment of the inventive wiring harness socket shown in FIG. 8A;

FIG. 8F is a representational view of several wiring harness sockets attached electrically in either parallel or series configuration;

FIG. 9A is a partially cross-sectional end view of an embodiment of the rail of the present invention as shown with an embodiment of the wiring harness illustrated in FIGS. 8A–8F disposed therein; and FIG. 9B is a partially cross-sectional end view of an embodiment of the rail of the present invention as shown with an alternate embodiment of the wiring harness disposed therein.

DETAILED DESCRIPTION OF THE PREFERRED EMBODIMENT

Figure 1:
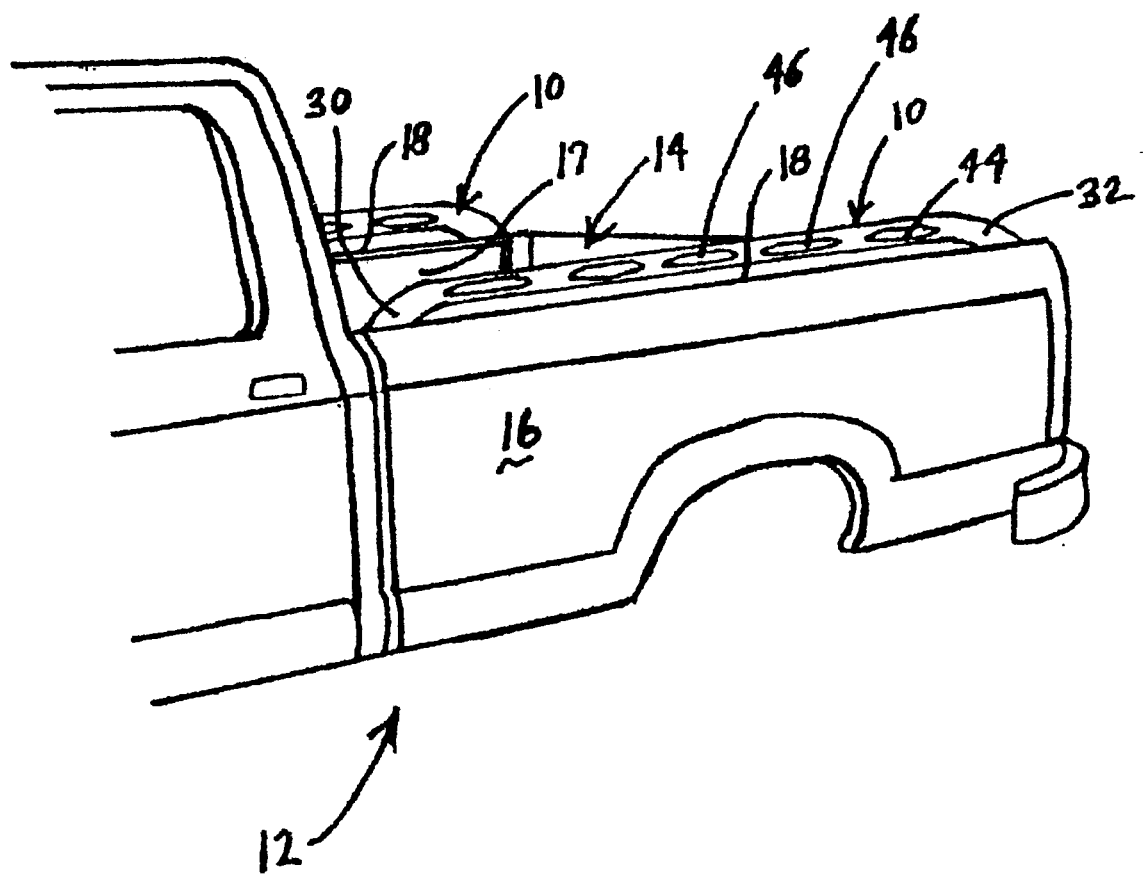
FIG. 1 is a fragmentary side perspective view of a pick-up truck in which a pair of tie-down rails of the present invention installed on the sidewalls of the truck.

With reference to FIG. 1, a truck 12 having a bed 14 partially defined by sidewalls 16 and 17, each sidewall 16 and 17 has a top ledge 18, and is shown with an embodiment of the present invention which is designated generally by the reference numeral 10. Tie-down rails 10 each comprise an elongated tubular body having a substantially circular cross-section, a substantially hollow interior 20, a linear section "L" which is parallel to a longitudinal axis Z and merges with an intermediate section "T" which in turn merges with an angular section "A". In the preferred embodiment, the rail 10 includes a body 19, comprised of sections or portions L, I and A where L is parallel to a longitudinal axis Z as just described, has a planar top surface 22 and a rounded bottom 24 and sides 26 and 28 (see FIGS. 2A and 3A). The juncture where the planar surface 22 meets the rounded surface 26 and 28 forms an edge E, and a line T drawn tangent to the rounded surface 26 (or 28) will form an angle with a plane P drawn parallel to the planar surface (see FIG. 3A). The width of the outside or exterior planar W/OUT is greater than the width of the inside planar surface W/IN (see FIG. 2A).

Figure 3A:
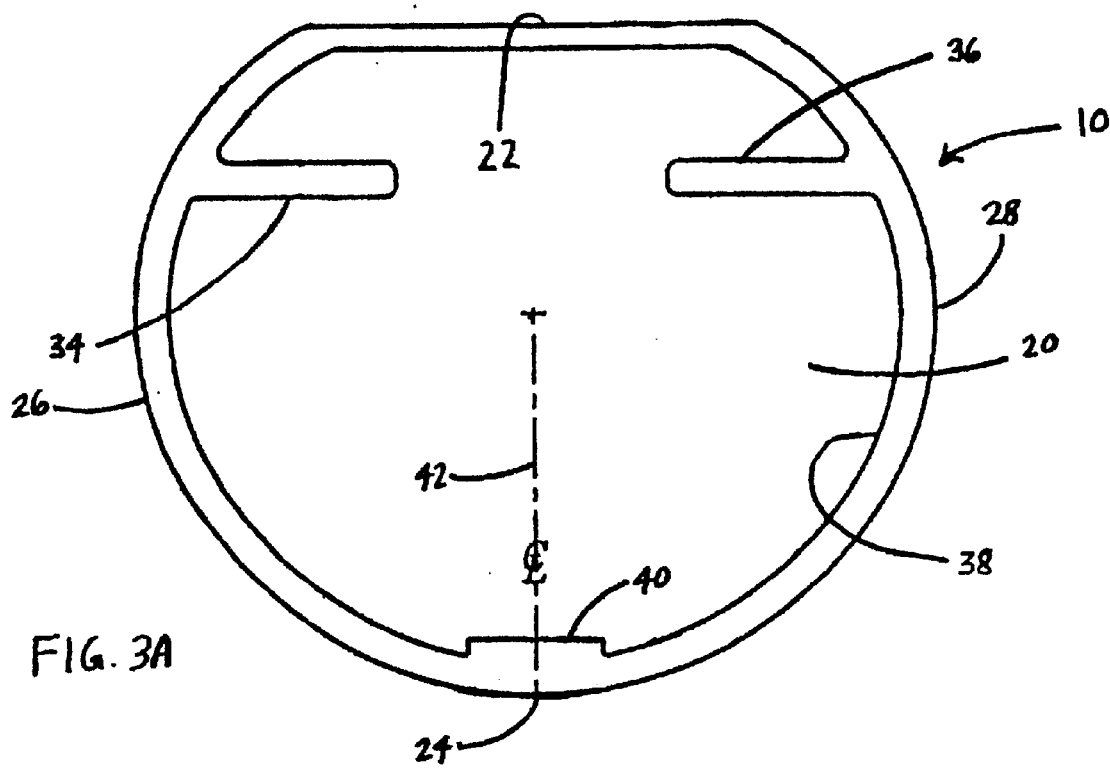
FIG. 3A is a cross-sectional view of the embodiment of the present invention taken along line 2—2 of FIG. 2A.
Figure 3B:
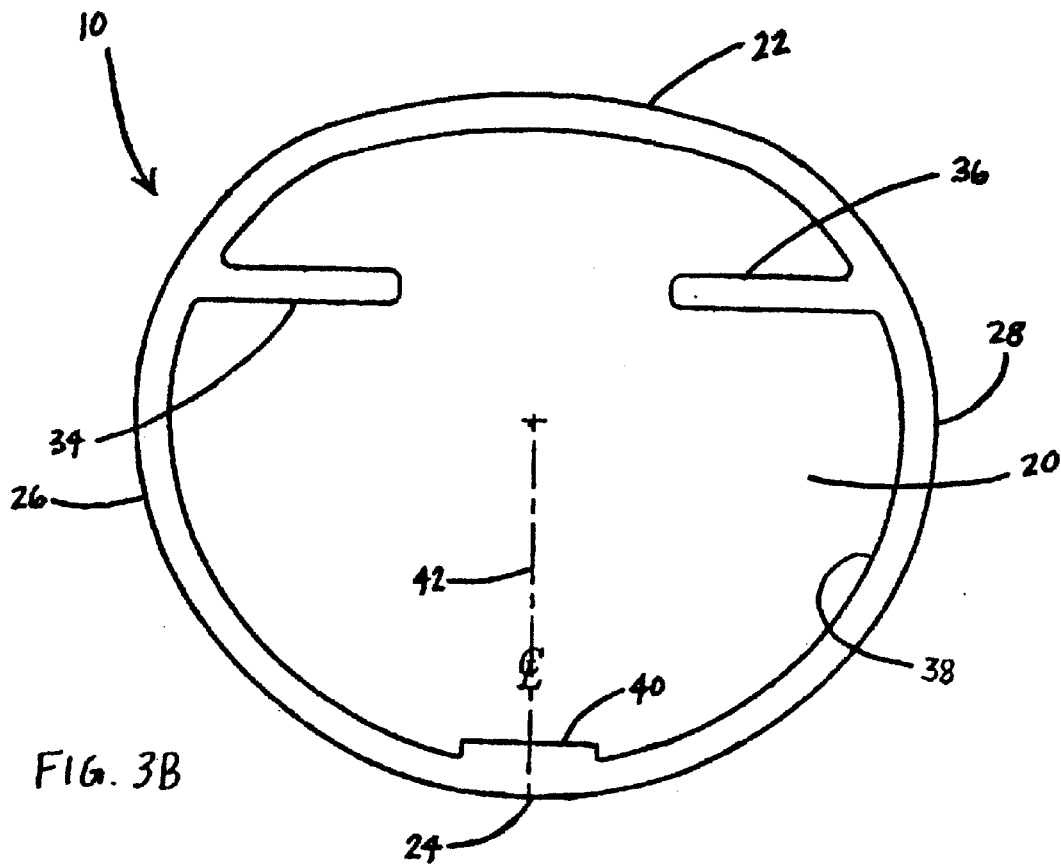
FIG. 3B is a cross-sectional view of an alternate embodiment of the present invention.

Alternatively, the top surface 22 may be slightly arched (see FIG. 3B). The rail 10 further includes spaced apart open ends 30 and 32 extending angularly downward from a central portion 21 of the body 19. The ends 30 and 32 are adapted to rest on the ledge 18 of the sidewall 16 or 17. In the preferred embodiment, each end 30 and 32 extends downward from a central portion 21 of the body 19 forming an obtuse angle therewith. Accordingly, the cross-sectional area at the ends 30 and 32 of the rail 10 is greater than the cross-sectional area of the rail 10 intermediate the ends 30 and 32. Alternatively, the ends 30 and 32 may extend downward from the central portion 21 of the body 19, forming a right angle therewith.

With reference to FIG. 3A and 3B, the rail further includes flange means projecting into the interior 20 of the rail 10 from an inner surface 38. In the preferred embodiment, the flange means comprises a pair of oppositely disposed flanges 34 and 36 projecting into the interior 20 of the rail 10 from the sides 26 and 28 and positioned in a plane parallel to the top surface 22. The flange means may further include a rib 40 projecting into the interior 20 of the rail 10 from the bottom 24 along a centerline 42 of the rail 10. The rib 40 and the flanges 34 and 36 preferably extend longitudinally from the inner surface 38 along the entire length of the rail 10. However, it is also contemplated that the rib 40 and the flanges 34 and 36 project from the inner surface 38 of the rail 10 intermittently along its length.

Figure 3D:
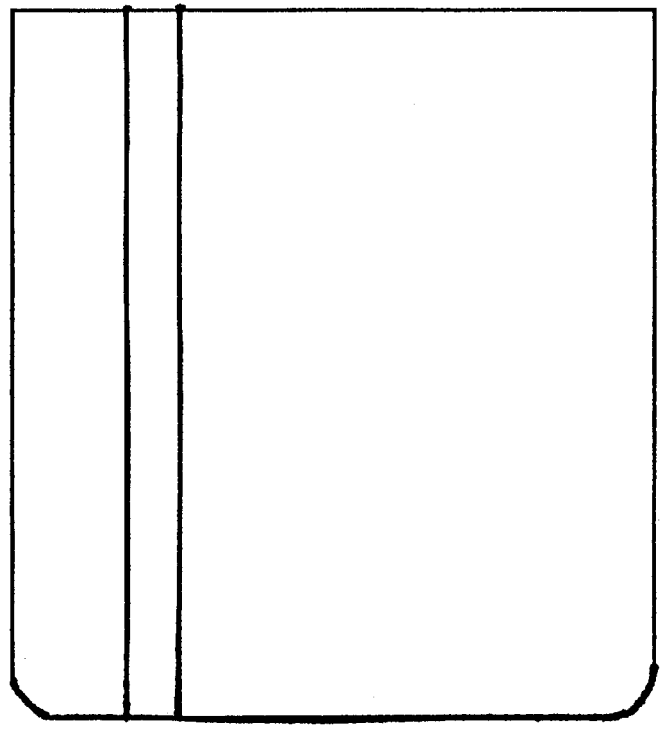
FIGS. 3C and 3D are front and side views respectively of an inventive mandrel tool useful for forming the rail of the present invention.
Figure 3C:
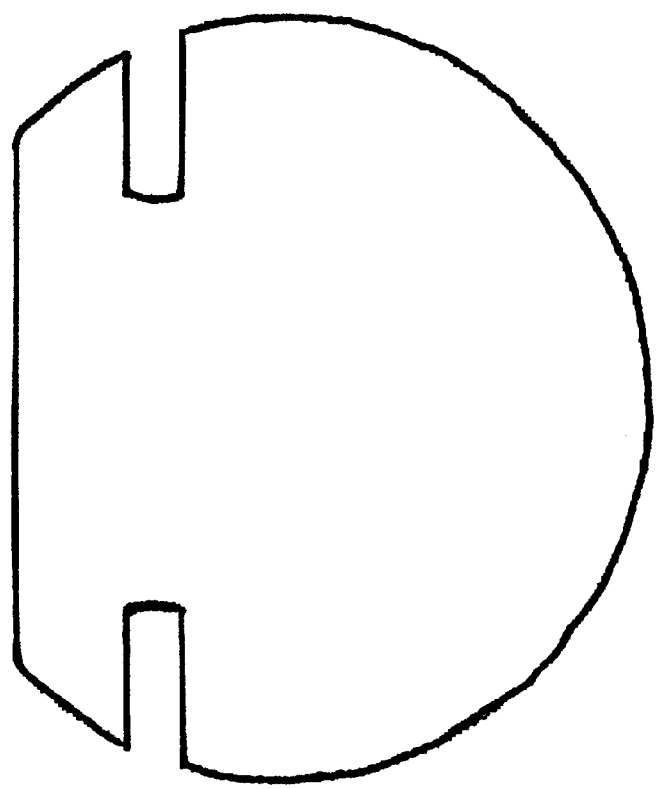
Figure 4C:
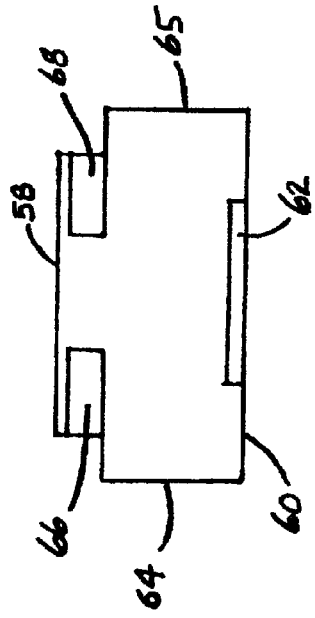
FIG. 4C is an end elevational view of the bracket shown in FIG. 4A.
Figure 4D:
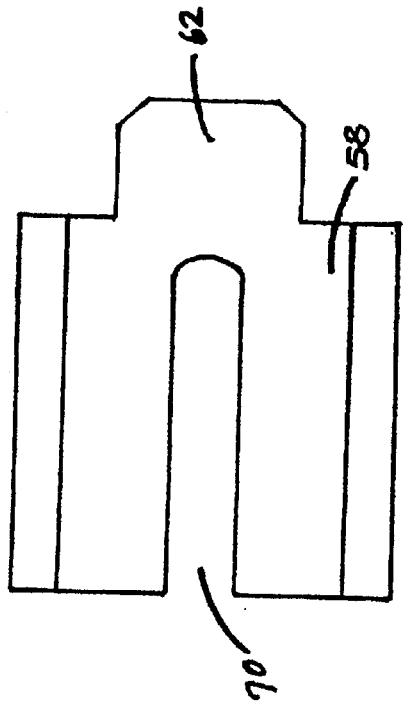
FIG. 4D is a top elevational view of the bracket shown in FIG. 4A.
Figure 4A:
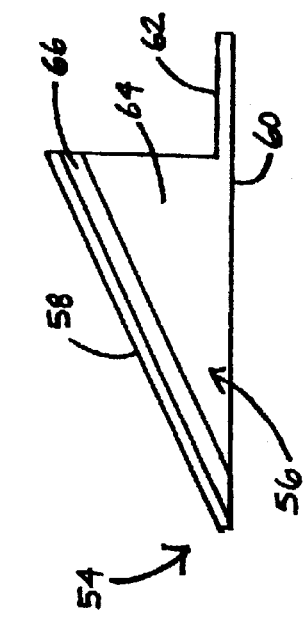
FIG. 4A is a side elevational view of an embodiment of the bracket of the present invention.
Figure 4B:
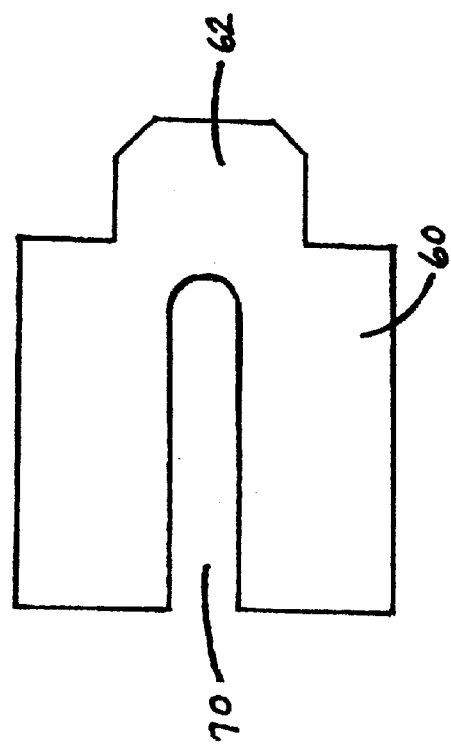
FIG. 4B is a bottom elevational view of the bracket shown in FIG. 4A.

With reference to FIGS. 3C and 3D, a mandrel 51 is illustrated. The mandrel 51 corresponds in configuration to the interior dimension and construct of the rail 10. Mandrel 51 is used after the tubular rail is extruded and during the bending processes to form the angled portion of the rail. The exterior surface of the mandrel 51 corresponds identically to the interior of the rail 10 (see the various Figures). Hence, the reference numerals followed by an "X" of FIGS. 3C and 3D correspond to the rail structure numbered similarly but without the "X" suffix. When the metal material from which the inventive rail is made is extruded and the mandrel 51 is inserted into the rail, the mandrel may be withdrawn from the rail as the rail is bent in order to render a continuous tubing form. Unlike conventional rails and bending the interior flanges 34 and 36 as well as rib 40 provides sufficient strength to the rail to prevent buckling at the planar surface region of the rail.

With reference to FIGS. 4A–4D and 5A–5C, anchoring means are provided for attaching the rail 10 to the ledge 18 at stake pockets or openings. In the preferred embodiment, the anchoring means comprises a bracket 54 configured to be received within the end 30 or 32 of the rail 10 and to engage the inner surface 38 of the rail 10 to prevent movement of the bracket 54 within the rail 10 (FIGS.

4A–4D). The bracket 54 is generally wedge-shaped and includes a body 56 having a top surface 58, a bottom or ledge-engaging surface 60 and spaced apart sides 64 and 65. A tongue 62 for engaging the inner surface 38 of the rail 10 is formed integrally with the bottom surface 60 of the bracket 54 and extends therefrom. A longitudinal slot 70 configured to receive a fastener 48 is formed in the body 56 along a centerline.

Figure 6B:
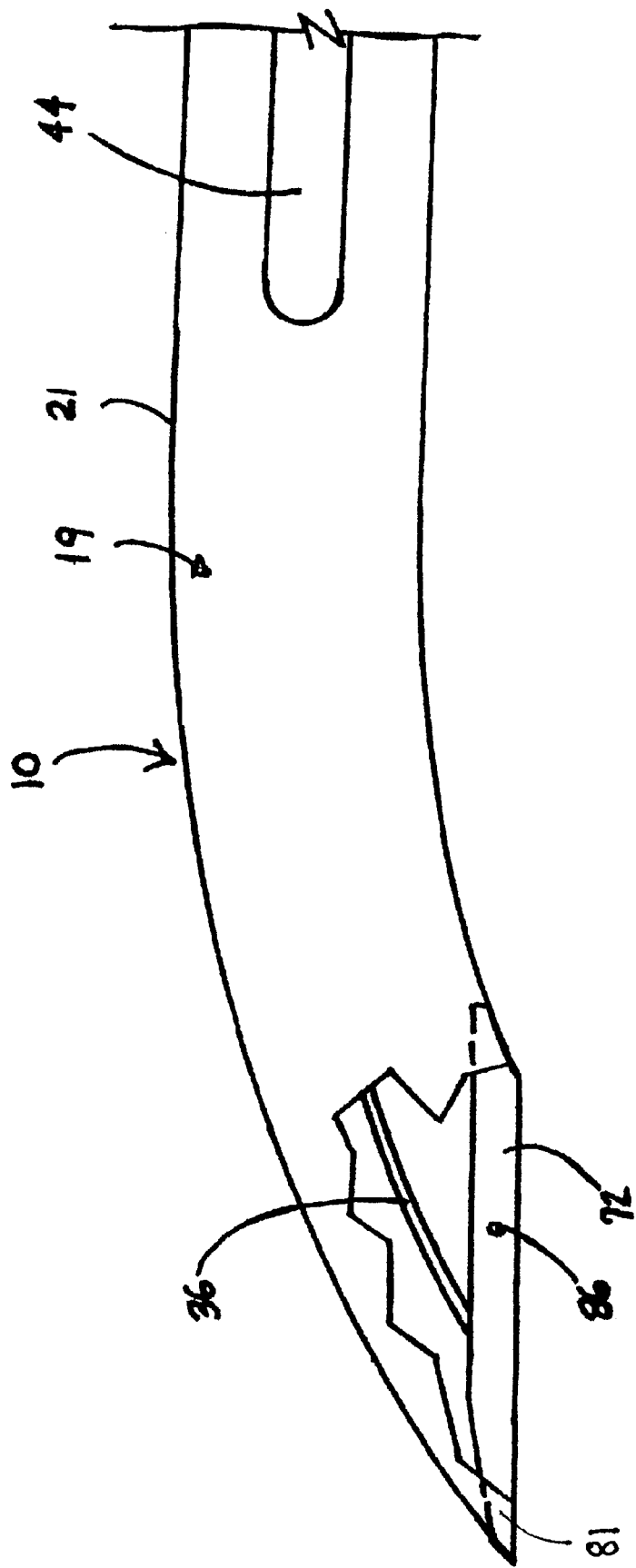
FIG. 6B is a partial side elevational view of the present invention with a cutaway portion showing the bracket of FIG. 5A operatively positioned therein.

Channels 66 and 68 configured to cooperatively engage flanges 34 and 36 are formed in the sides 64 and 65, respectively, of the body 56. Accordingly, the bracket 54 is inserted into the end 30 or 32 of the rail 10 such that the channels 66 and 68 slidably engage flanges 34 and 36 and the tongue 62 engages the inner surface 38 of the rail 10 (see FIG. 6A). Alternatively, the bracket 54 may be inserted into the end 30 or 32 of the rail 10 and secured therein by a fastener 48, such as a bolt or screw 50 having ears E.

The bracket 54 is positioned within the rail 10 such that the bottom 60 of the bracket 54 is flush with the end 30 or 32 of the rail 10. A fastener 48, such as a bolt 50, is received within a bore 52 formed in the top surface 22 of the rail 10 and extends through the slot 70 to operatively engage at the stake pocket or opening of the ledge 18 for attachment thereto.

Figure 5C:
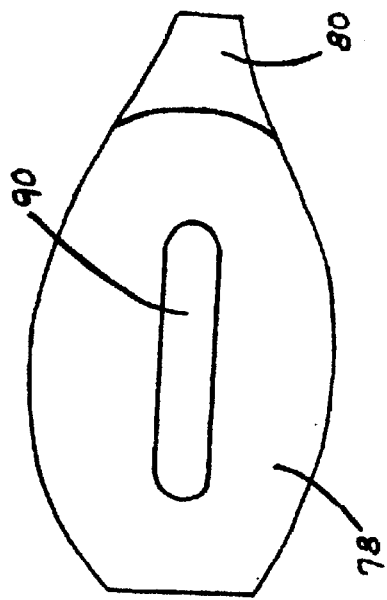
FIG. 5C is a bottom elevational view of the bracket shown in FIG. 5A.
Figure 5A:
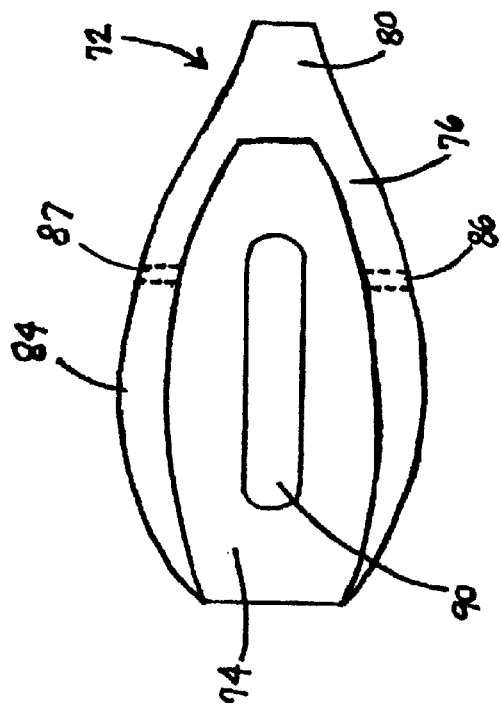
FIG. 5A is a top elevational view of an alternate embodiment of the bracket of the present invention.
Figure 5B:
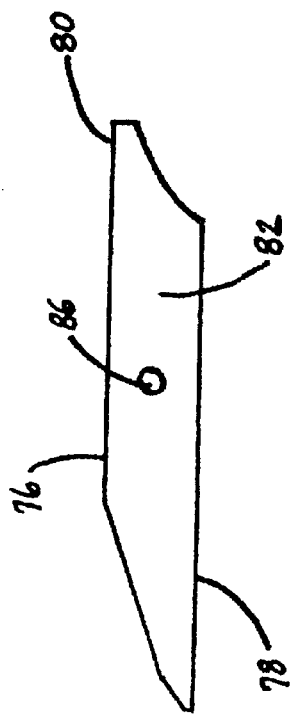
FIG. 5B is a side elevational view of the bracket shown in FIG. 5A.

In an alternate embodiment, the bracket 72 includes a body 74 having a top 76, a bottom or ledge-engaging surface 78 and sides 82 and 84 (FIGS. 5A–5C). A longitudinal slot 90 configured to receive a fastener 48 is formed in the body 74 along a centerline. A tongue or post 80 configured to engage the inner surface 38 of the rail 10 extends from a front 81 of the body 74 to prevent movement of the bracket 72 within the rail 10 (see FIG. 6B). The bracket 72 is attached to the rail 10 by at least one fastener 48; however, in the preferred embodiment, the bracket 72 is attached to the rail 10 at both sides. Accordingly, a fastener 48, such as a screw 50, extends through aligned bores 86 and 87 formed in the side 82 of the bracket 72 and the side 26 of the rail 10, respectively.

As described above, the bracket 72 is received within the rail 10 such that the bottom 78 of the bracket 72 is flush with the end 30 or 32 of the rail 10. A fastener 48 is received within a bore 52 formed in the top surface 22 of the rail 10 and extends through the slot 90 to attach the rail 10 to the ledge 18 at stake pockets or openings formed in the top ledge 18 of the sidewall 16 or 17.

In yet another embodiment shown in FIGS. 2A and 2B, the anchoring means comprises a bracket 116 configured to seat on the flanges 34 and 36 extending from the interior surface 38 of the rail 10. The bracket 116 comprises a cylindrical body 118 having a planar top surface 120, a bottom surface 122, and a longitudinal bore 124 extending therethrough. The bottom surface 122 of the body 118 is angled in accordance with the curvature of the flanges 34 and 36 at the ends 30 and 32 of the rail 10 so that the bracket 116 cooperatively seats on the flanges 34 and 36. A fastener 48 is inserted into the bore 52 formed in the top 22 of the rail 10 and extends through the bore 124 formed in the bracket 116 to operatively engage the ledge 18 of the truck bed 14 (FIG. 2A). The bottom surface 122 of the bracket 116 may be knurled or include teeth for biting the surface of the flanges 34 and 36 when the fastener 48 is tightened to retain the bracket 116 in the desired position.

The rail 10 may include a plurality of longitudinal slots or openings 44 formed along the sides 26 and 28 of the rail 10. In the preferred embodiment, an extrusion 46 constructed of vinyl or plastic, for example, is received within the rail 10 and positioned along the inner surface 38 at the sides 26 and 28 adjacent the plurality of slots 44 such that the extrusion 46 is visible through the plurality of slots 44.

With reference to FIGS. 6C–6F, a lens cover 150 resembles a reflector type lens. Lens 150 has a longitudinal body 152 having a lip portion 154 which merges with a center portion 156. The exterior surface 158 is preferably arcuate to match to contour of the rail 10 to which it is attached. Ears 160 have pointed prongs 162 which engage the interior surface 38 of the rail during use (see FIGS. 9A and 9B). The preferred lens 150 is therefore removable, but alternate embodiment may comprise glue-in lens or lens having more rigid and permanent means of affixation. The removable lens is preferred in order to facilitate the servicing of the bulbs 208 when the burn out. The reflector type lens is preferred because of its inherent safety features when used in conjunction with the inventive rail system which is believed to effectively illuminate the extent of the bed at the rear of the pick-up truck at night or in dimly lit areas.

Figure 7C:
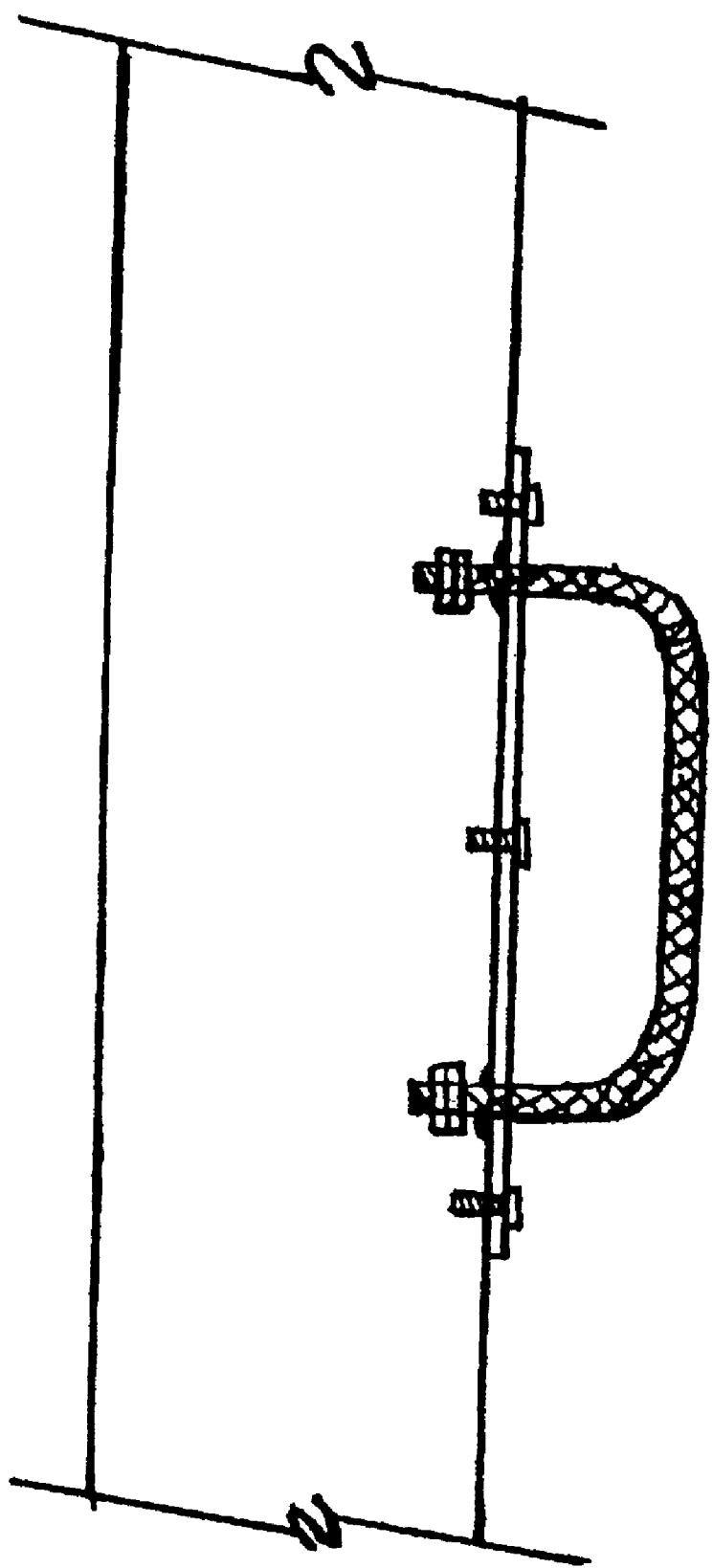
FIG. 7C is a partial sectional view of the rail of the present invention showing the clip assembly attached thereto.

With reference to FIGS. 7A, 7B and 7C, a plurality of clips or clip assemblies are provided for attaching a tie-down cord to the tie-down rail 10 and to prevent the tie-down cord from creeping along the length of the rail 10. In the preferred embodiment, the clip assembly comprises a plate 92 having a first side 94, a second side 96, and a plurality of spaced apart bores 98 through 104, loop means 106 and fasteners 108 for attaching the plate 92 to the rail 10. Two of the bores 98 and 100 are configured to receive the loop means 106, and the remaining bores 102, 103 and 104 are configured to receive a fastener 108.

The loop means 106 further comprises a length of spring wire or other suitable cord 110 having spaced apart ends 112 and 114 extending through bores 98 and 100 from the first side 94 of the plate 92 to the second side 96 of the plate 92 to form a loop capable of receiving a tie-down cord. The ends 112 and 114 of the wire 110 are retained adjacent the second side 96 of the plate by clamps 116, which are received within bores 120 formed in the rail 10 when the plate 92 is operably attached to the rail 10. The plate 92 is attached to the rail 10 by fasteners 108, such as self-tapping screws, extending through bores 102, 103 and 104 and aligned bores 116, 117 and 11 8, respectively, in the rail 10. Alternatively, the clips may simply comprise a plurality of hooks or eye bolts 120 attached to the rail 10.

With reference to FIGS. 8A–8F and 9, a wiring harness is designated generally by the reference numeral 200 and includes at least one socket 202 having a platform portion 204 and a bulb mount 206. Bulb mount 206 accommodates a bulb 208 (FIG. 8A) and electrical connections 210 (FIG. 8A). Platform 204 has spaced apart legs 212 which are moderately flexible such that they may be deflected from their rest positions as shown to engage the interior surface of the rail preferably at the flanges 34 and 36 to suspend the bulb 208 freely within the interior 20 of the rail 10 (see FIG. 9). Electrical connections may then rest freely within the interior 20 wherever they happen to lie after the socket 202 is installed therein.

With reference to FIG. 9B, an alternate embodiment of the wiring harness of the present invention is shown and disclosed. The socket 302 includes a platform 304 which is preferably a length or strip of flexible spring steel or similar metal. The Bulb mount 306 is attached thereto and extends upwardly therefrom. A Bulb 208 and electrical connections 210 are also provided in a manner similar to that described above. The platform may be positioned at virtually any user selectable location such as to engage the flanges 34 and 36, or the sidewall 38 as shown. This embodiment is particularly useful with steel rails that do not incorporate the flanges 34 and 36 hence the figure illustrates the flanges with dashed lines to show their optional nature with respect to this embodiment.

In use, the socket 202 or 302 is inserted into the interior 20 of the rail and the platform 204 and 304 engage the interior surface 34, 36 or 38 of the rail. With respect to the platform 304, the spring steel is flexed from its rest state and is inserted into the rail. After insertion, the spring steel; having a shape memory tries to resume its rest position causing it to apply pressure to the interior surfaces 32, 34, and/or 36 enabling it to be relatively secured and stationary.

With regard to the platform 204. The spaced apart legs 212 have flange engaging hooks 214 with cutouts 216. The legs 212 are flexed away from the flanges 34 and 36 prior to installation. After installation, the tendency of the legs 212 to resume their rest positions as shown in FIGS. 8A–8F causes them to bias against the flanges 34 and 36 and secure the socket 204 in a relatively secure stationary position within the rail 10.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected by the appended claims.

What is claimed is:

1. A tie-down rail for a truck bed including spaced apart sidewalls each having a top ledge, comprising:
    an elongated unitary tubular body having spaced apart ends, a top, a bottom, a hollow interior, an interior surface, a substantially linear portion which is parallel to a longitudinal axis, an intermediate portion extending from and merging with the substantially linear portion, and an angular portion merging with and extending from the intermediate portion to form an angle with the longitudinal axis;
    the linear portion has a first outer cross-sectional profile, the intermediate portion has a second outer cross-sectional profile, and the angular portion has a third outer cross-sectional profile, such that the first outer cross-sectional profile and second outer cross-sectional profile and third outer cross-sectional profile are substantially identical;
    at least one aperture formed in the tubular body;
    lighting means for illuminating the interior of the body and enabling light to pass from the interior of tubular body through the at least one aperture; and
        wherein the lighting means further includes a wiring harness having a platform portion configured for flexible engagement with the interior surface of the body to securely attach the lighting means within the hollow interior.

2. The tie-down rail of claim 1, further comprising:
    said interior surface of said body having inwardly projecting opposing flanges extending therefrom.

3. The tie-down rail of claim 1, further comprising:
    said interior surface of said body having a reinforcing rib positioned thereon.

4. The tie-down rail of claim 1, such that:
    the body is comprised of a metal material selected from the group of metal materials consisting of steel, aluminum, steel alloys, and aluminum alloys.

5. The tie-down rail of claim 1, further comprising:
    at least one lens to cover the at least one aperture.

6. The tie-down rail of claim 5, such that:
    the lens is configured to frictionally engage the body of the rail during use.

7. The tie-down rail of claim 5, wherein:
    the lens is a safety reflector.

8. The tie-down rail of claim 1, such that the lighting means further comprises:
    socket means for receiving at least one illuminatable bulb and illuminating said bulb.

9. The tie down rail of claim 1, such that the lighting means further comprises:
    said wiring harness having at least one electrical socket configured for receiving an illuminatable bulb, and
    an illuminatable bulb operably connected to the at least one electrical socket;
        wherein the wiring harness supplies electrical energy from a source thereof to the at least one socket for illuminating the bulb.

10. The tie-down rail of claim 8, such that the socket means further comprises:
    said wiring harness having a plurality of electrical sockets configured to receive an illuminatable bulb and capable of supplying electrical energy from a source thereof to the plurality of electrical sockets to illuminate the bulb.

11. The tie-down rail of claim 8, wherein:
    the socket means is configured for engagement with the interior of the body.

12. The tie-down rail of claim 10, wherein:
    at least one of the plurality of electrical sockets is configured for engagement with the interior of the body.

13. A tie-down rail for a truck bed including spaced apart sidewalls each having a top ledge, comprising:
    an elongated tubular body having a substantially linear portion which is parallel to a longitudinal axis, an intermediate portion extending from and merging with the substantially linear portion, and an angular portion having spaced apart ends wherein one of the spaced apart ends merges with and extends from the intermediate portion to form an angle with the longitudinal axis;
    the linear portion has a first outer cross-sectional profile, the intermediate portion has a second outer cross-sectional profile, and the angular portion has a third outer cross-sectional profile, such that the first outer cross-sectional profile and second outer cross-sectional profile and third outer cross-sectional profile are substantially identical;
        the second outer cross-sectional profile includes an external arcuate portion which merges with a planar portion to form a continuous external wall; and
    an inside surface of the planar portion and an outside surface of the planar portion wherein the outside surface has a greater width than the inside surface portion.

14. The tie-down rail of claim 13 further comprising:
    a juncture between the arcuate portion and the planar portion comprising a pair of spaced apart edges.

15. The tie-down rail of claim 14, such that the pair of spaced apart edges further comprises:
    a pair of spaced apart parallel edges.

16. The tie-down rail of claim 13, such that:

a line drawn tangent to the arcuate portion always forms an angle with a plane parallel with the planar portion.

17. The tie-down rail of claim 13, further comprising:

an interior surface of the arcuate portion having inwardly projecting opposing flanges extending therefrom.

18. The tie-down rail of claim 13, further comprising:

an interior surface of the arcuate portion having a reinforcing rib positioned opposite the inside surface of the planar portion.

\* \* \* \* \*